United States Patent
Foster et al.

(10) Patent No.: US 9,501,348 B2
(45) Date of Patent: *Nov. 22, 2016

(54) METHOD AND SYSTEM FOR MONITORING OF LIBRARY COMPONENTS

(71) Applicant: KIP CR P1 LP, New York, NY (US)

(72) Inventors: Michael R. Foster, Round Rock, TX (US); Allen J. Rohner, Austin, TX (US); Patrick S. Tou, Austin, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,954

(22) Filed: Jan. 29, 2016

(65) Prior Publication Data

US 2016/0148646 A1 May 26, 2016

Related U.S. Application Data

(63) Continuation of application No. 14/574,077, filed on Dec. 17, 2014, now Pat. No. 9,280,410, which is a continuation of application No. 14/324,980, filed on Jul. 7, 2014, now Pat. No. 8,949,667, which is a continuation of application No. 11/801,809, filed on May 11, 2007, now Pat. No. 8,832,495.

(51) Int. Cl.
| | |
|---|---|
| *G06F 11/00* | (2006.01) |
| *G06F 3/00* | (2006.01) |
| *G06F 9/44* | (2006.01) |
| *G06F 11/07* | (2006.01) |
| *G11B 15/68* | (2006.01) |
| *G11B 17/22* | (2006.01) |
| *G06F 11/30* | (2006.01) |
| *G11B 20/18* | (2006.01) |

(52) U.S. Cl.
CPC ......... *G06F 11/079* (2013.01); *G06F 11/0727* (2013.01); *G06F 11/3058* (2013.01); *G06F 11/3096* (2013.01); *G11B 15/689* (2013.01); *G11B 15/6835* (2013.01); *G11B 15/6895* (2013.01); *G11B 17/228* (2013.01); *G11B 20/18* (2013.01)

(58) Field of Classification Search
None
See application file for complete search history.

(56) References Cited

U.S. PATENT DOCUMENTS

| | | | |
|---|---|---|---|
| 3,704,363 | A | 11/1972 | Salmassy et al. |
| 3,984,923 | A | 10/1976 | Rawson et al. |

(Continued)

FOREIGN PATENT DOCUMENTS

| | | |
|---|---|---|
| EP | 0726570 | 8/1996 |
| GB | 2419198 | 4/2006 |

OTHER PUBLICATIONS

Weber, Ralph O. (ed.) Information Technology—SCSI Primary Commands—4 (SPC-4), Project T10/1731-D, Working Draft, rev. 2, Sep. 15, 2005, ENDL Texas, Dallas, TX, 499 pgs.

(Continued)

*Primary Examiner* — Charles Swift
(74) *Attorney, Agent, or Firm* — Sprinkle IP Law Group

(57) ABSTRACT

Embodiments of the present invention provide a method for monitoring components in a library by tracking the movement of library components. By tracking the movement of library components, the degradation of library components can be monitored and the reliability of library components determined, allowing unreliable components to be bypassed or replaced, enhancing the reliability of the library and preventing data loss.

21 Claims, 4 Drawing Sheets

(56) References Cited

U.S. PATENT DOCUMENTS

| | | |
|---|---|---|
| 4,754,345 A | 6/1988 | Karlstetter |
| 4,899,230 A | 2/1990 | Sherritt |
| 4,932,826 A | 6/1990 | Moy et al. |
| 4,958,235 A | 9/1990 | Sims et al. |
| 5,004,393 A | 4/1991 | Lunka |
| 5,253,126 A | 10/1993 | Richmond |
| 5,303,214 A | 4/1994 | Kulakowski |
| 5,309,768 A | 5/1994 | Mathews et al. |
| 5,386,324 A | 1/1995 | Fry et al. |
| 5,668,800 A | 9/1997 | Stevenson |
| 5,781,703 A | 7/1998 | Desai et al. |
| 5,822,516 A | 10/1998 | Krech, Jr. |
| 5,875,303 A | 2/1999 | Huizer et al. |
| 5,881,221 A | 3/1999 | Hoang et al. |
| 5,883,864 A | 3/1999 | Saliba |
| 6,052,264 A | 4/2000 | Curtis |
| 6,052,341 A | 4/2000 | Bingham et al. |
| 6,058,092 A | 5/2000 | Masters et al. |
| 6,065,087 A | 5/2000 | Keaveny et al. |
| 6,163,853 A | 12/2000 | Findlay et al. |
| 6,195,663 B1 | 2/2001 | Cheng |
| 6,269,330 B1 | 7/2001 | Cidon et al. |
| 6,304,880 B1 | 10/2001 | Kishi |
| 6,490,253 B1 | 12/2002 | Miller et al. |
| 6,578,083 B2 | 6/2003 | Tuck, III |
| 6,624,958 B1 | 9/2003 | Alva |
| 6,636,981 B1 | 10/2003 | Barnett et al. |
| 6,715,031 B2 | 3/2004 | Camble et al. |
| 6,725,394 B1 | 4/2004 | Bolt |
| 6,799,156 B1 | 9/2004 | Rieschl et al. |
| 6,823,401 B2 | 11/2004 | Feather, Jr. et al. |
| 6,839,824 B2 | 1/2005 | Camble et al. |
| 6,950,871 B1 | 9/2005 | Honma et al. |
| 6,971,046 B1 | 11/2005 | Johnson et al. |
| 7,076,391 B1 | 7/2006 | Pakzad et al. |
| 7,194,538 B1 | 3/2007 | Rabe et al. |
| 7,200,546 B1 | 4/2007 | Nourmohamadian et al. |
| 7,200,722 B2 | 4/2007 | Goodman |
| 7,278,067 B1 | 10/2007 | Coatney et al. |
| 7,310,745 B2 | 12/2007 | Schnapp et al. |
| 7,346,801 B2 | 3/2008 | Brunelle et al. |
| 7,386,667 B2 | 6/2008 | Estelle et al. |
| 7,443,801 B2 | 10/2008 | Neidhardt et al. |
| 7,444,469 B2 | 10/2008 | Estelle et al. |
| 7,483,810 B2 | 1/2009 | Jackson et al. |
| 7,492,720 B2 | 2/2009 | Pruthi et al. |
| 7,573,664 B2 | 8/2009 | Bentley et al. |
| 7,583,604 B2 | 9/2009 | Couturier |
| 7,596,096 B2 | 9/2009 | Crawford et al. |
| 7,613,748 B2 | 11/2009 | Brockway |
| 7,627,786 B2 | 12/2009 | Bello et al. |
| 7,653,840 B1 | 1/2010 | Taylor et al. |
| 7,809,990 B2 | 10/2010 | Sasaki |
| 7,885,805 B2 | 2/2011 | Dickens et al. |
| 7,908,366 B2 | 3/2011 | Sims |
| 7,971,006 B2 | 6/2011 | Justiss et al. |
| 7,974,215 B1 | 7/2011 | Sims |
| 8,032,701 B1 | 10/2011 | Glade |
| 8,035,911 B2 | 10/2011 | Ballard et al. |
| 8,099,624 B1 | 1/2012 | Saxena et al. |
| 8,108,544 B2 | 1/2012 | Ramakrishnan et al. |
| 8,117,501 B2 | 2/2012 | Taniyama et al. |
| 8,145,572 B2 | 3/2012 | Ito |
| 8,180,824 B2 | 5/2012 | Mccoy et al. |
| 8,195,986 B2 | 6/2012 | Meaney et al. |
| 8,495,432 B2 | 7/2013 | Dickens et al. |
| 8,631,127 B2 | 1/2014 | Sims |
| 8,631,281 B2 | 1/2014 | Stripling et al. |
| 8,639,807 B2 | 1/2014 | Sims |
| 8,644,185 B2 | 2/2014 | Sims |
| 8,645,328 B2 | 2/2014 | Sims |
| 8,650,241 B2 | 2/2014 | Moody, II et al. |
| 8,832,495 B2 | 9/2014 | Foster et al. |
| 8,843,787 B1 | 9/2014 | Foster et al. |
| 8,949,667 B2 | 2/2015 | Foster et al. |
| 9,015,005 B1 | 4/2015 | Stripling |
| 9,058,109 B2 | 6/2015 | Moody, II et al. |
| 9,081,730 B2 | 7/2015 | Foster et al. |
| 9,092,138 B2 | 7/2015 | Sims et al. |
| 9,280,410 B2 | 3/2016 | Foster et al. |
| 9,317,358 B2 | 4/2016 | Foster et al. |
| 2001/0039579 A1 | 11/2001 | Trcka et al. |
| 2001/0040748 A1 | 11/2001 | Nagai et al. |
| 2002/0006004 A1 | 1/2002 | Miyamura |
| 2002/0055999 A1 | 5/2002 | Takeda |
| 2002/0169996 A1 | 11/2002 | King et al. |
| 2003/0016609 A1* | 1/2003 | Rushton ............ G11B 11/10595 369/53.2 |
| 2003/0070053 A1 | 4/2003 | Gallo et al. |
| 2003/0097439 A1 | 5/2003 | Strayer et al. |
| 2003/0126395 A1 | 7/2003 | Camble et al. |
| 2003/0128448 A1 | 7/2003 | Gunderson et al. |
| 2003/0225865 A1 | 12/2003 | Koestler |
| 2003/0233431 A1 | 12/2003 | Reddy et al. |
| 2004/0022263 A1 | 2/2004 | Zhao et al. |
| 2004/0030857 A1 | 2/2004 | Karkirian |
| 2004/0078419 A1 | 4/2004 | Ferrari et al. |
| 2004/0078697 A1 | 4/2004 | Duncan |
| 2004/0139195 A1 | 7/2004 | Feather, Jr. et al. |
| 2004/0139240 A1 | 7/2004 | DiCorpo et al. |
| 2004/0168102 A1 | 8/2004 | Tsunoda |
| 2005/0044451 A1 | 2/2005 | Fry et al. |
| 2005/0052772 A1 | 3/2005 | Barbian et al. |
| 2005/0076263 A1 | 4/2005 | Tomita |
| 2005/0086554 A1 | 4/2005 | Simes |
| 2005/0091369 A1 | 4/2005 | Jones |
| 2005/0138195 A1 | 6/2005 | Bono |
| 2005/0149829 A1 | 7/2005 | Lee |
| 2005/0174869 A1 | 8/2005 | Kottomtharayil et al. |
| 2005/0210161 A1 | 9/2005 | Guignard et al. |
| 2005/0231846 A1 | 10/2005 | Winarski et al. |
| 2005/0246376 A1 | 11/2005 | Lu et al. |
| 2005/0246509 A1 | 11/2005 | Topham et al. |
| 2005/0262231 A1 | 11/2005 | Lowe et al. |
| 2006/0085595 A1 | 4/2006 | Slater |
| 2006/0092850 A1 | 5/2006 | Neidhardt et al. |
| 2006/0126211 A1 | 6/2006 | Sasaki |
| 2006/0168499 A1 | 7/2006 | Edwards et al. |
| 2006/0170238 A1 | 8/2006 | Justiss et al. |
| 2006/0174071 A1 | 8/2006 | Justiss et al. |
| 2006/0190205 A1 | 8/2006 | Klein et al. |
| 2006/0242489 A1 | 10/2006 | Brockway et al. |
| 2007/0025008 A1 | 2/2007 | Ballard |
| 2007/0043885 A1 | 2/2007 | Gallo |
| 2007/0067678 A1 | 3/2007 | Hosek et al. |
| 2007/0079048 A1 | 4/2007 | Starr et al. |
| 2007/0106840 A1 | 5/2007 | Estelle |
| 2007/0186066 A1 | 8/2007 | Desai et al. |
| 2007/0226336 A1 | 9/2007 | Katagiri et al. |
| 2007/0253088 A1 | 11/2007 | Clarke et al. |
| 2007/0255920 A1 | 11/2007 | Gold |
| 2007/0294591 A1 | 12/2007 | Usynin et al. |
| 2008/0019283 A1 | 1/2008 | Emile |
| 2008/0098168 A1 | 4/2008 | Estelle |
| 2008/0109547 A1 | 5/2008 | Bao et al. |
| 2008/0115015 A1 | 5/2008 | Ikezawa et al. |
| 2008/0259809 A1 | 10/2008 | Stephan et al. |
| 2009/0044047 A1 | 2/2009 | Bates et al. |
| 2009/0059757 A1 | 3/2009 | Haustein et al. |
| 2009/0070092 A1 | 3/2009 | Dickens et al. |
| 2009/0103432 A1 | 4/2009 | Trikoz et al. |
| 2009/0106816 A1 | 4/2009 | Ito |
| 2009/0113129 A1 | 4/2009 | Deicke et al. |
| 2009/0177314 A1 | 7/2009 | Greco et al. |
| 2009/0199045 A1 | 8/2009 | Kasubuchi et al. |
| 2010/0023604 A1 | 1/2010 | Verma et al. |
| 2010/0033863 A1 | 2/2010 | Fry et al. |
| 2010/0125740 A1 | 5/2010 | Grechanik |
| 2010/0174878 A1 | 7/2010 | Davis et al. |
| 2010/0228805 A1 | 9/2010 | McCoy et al. |
| 2010/0250698 A1 | 9/2010 | Haustein et al. |
| 2010/0275219 A1 | 10/2010 | Carlson et al. |
| 2013/0067587 A1 | 3/2013 | Leet et al. |
| 2014/0085744 A1 | 3/2014 | Stripling et al. |

(56) References Cited

U.S. PATENT DOCUMENTS

| | | |
|---|---|---|
| 2014/0112185 A1 | 4/2014 | Sims |
| 2014/0122438 A1 | 5/2014 | Sims |
| 2015/0106654 A1 | 4/2015 | Foster et al. |
| 2015/0178006 A1 | 6/2015 | Stripling et al. |
| 2015/0243323 A1 | 8/2015 | Moody, II et al. |
| 2015/0278007 A1 | 10/2015 | Foster et al. |
| 2016/0134507 A1 | 5/2016 | Sims |
| 2016/0171999 A1 | 6/2016 | Stripling et al. |
| 2016/0196080 A1 | 7/2016 | Foster et al. |

OTHER PUBLICATIONS

Penokie, George (ed.) Information Technology—SCSI Block Commands—3 (SBC-3), T10/1799-D, Working Draft, Rev. 6, Jul. 24, 2006, IBM Corp., Rochester, MN, 169 pgs.
Weber, Ralph O. (ed.) Information Technology—SCSI Primary Commands—4 (SPC-4), Project T10/1731-D, Working Draft, rev. 10, Apr. 21, 2007, ENDL Texas, Dallas, TX, 551 pgs.
Weber, Ralph O.(ed.) Information Technology—SCSI Primary Commands—3 (SPC-3), Project T10/1416-D, Working Draft, rev. 22a, Mar. 25, 2005, ENDL Texas, Dallas, TX, 496 pgs.
Oetting, Erich (ed.) Information Technology—SCSI Media Changer Commands—2 (SMC-2), INCITS T10 Project 1383D, Working Draft, rev. 7, Nov. 18, 2003, Storage Tech Corp., Louisville, CO, 68 pgs.
International Search Report and Written Opinion for International Patent Application No. PCT/US2008/63227, mailed Aug. 29, 2008, 7 pgs.
International Search Report and Written Opinion for International Patent Application No. PCT/US2009/032402, mailed Jun. 29, 2009, 11 pgs.
International Search Report and Written Opinion for International Patent Application No. PCT/US2009/032390, mailed Jul. 3, 2009, 13 pgs.
Boehler, Paul, "Common SCSI/ATAPI Command Set for Streaming Tape" QIC 157, Revision D, Quarter-Inch Cartridge Drive Standards, Santa Barbara, CA, Dec. 13, 1995, 50 pgs.
Office Action for U.S. Appl. No. 12/025,322, mailed Dec. 30, 2009, 11 pgs.
Office Action for U.S. Appl. No. 12/025,436, mailed Mar. 30, 2010, 15 pgs.
Office Action for U.S. Appl. No. 12/024,755, mailed Jun. 23, 2010, 11 pgs.
Office Action for U.S. Appl. No. 12/025,322, mailed Jul. 8, 2010, 15 pgs.
International Preliminary Report on Patentability (Ch. I) for International Application No. PCT/US2009/032402, issued on Aug. 3, 2010, 8 pgs.
International Preliminary Report on Patentability (Ch. I) for International Application No. PCT/US2009/032390 issued on Aug. 10, 2010, 8 pgs.
Office Action for U.S. Appl. No. 12/025,436, mailed Sep. 15, 2010, 21 pgs.
"SCSI DDS Tape Expert Tool (mstm Online Help)," Hewlett Packard, updated Apr. 29, 2002 and printed on Aug. 30, 2010, 8 pgs. at http://docs.hp.com/hpux/onlinedocs/diag/stm/help/expert/scsi_ddsm.htm.
Office Action for U.S. Appl. No. 11/801,809, mailed Sep. 23, 2010, 31 pgs.
Office Action for U.S. Appl. No. 11/801,809, mailed Feb. 16, 2011, 23 pgs.
Office Action for U.S. Appl. No. 12/025,436, mailed Mar. 11, 2011, 25 pgs.
International Search Report and Written Opinion for International Patent Application No. PCT/US2011/021517, mailed Apr. 19, 2011, 12 pgs.
Office Action for U.S. Appl. No. 11/801,809, mailed Jun. 7, 2011, 16 pgs.
Office Action for U.S. Appl. No. 12/025,436, mailed Aug. 22, 2011, 32 pgs.
International Preliminary Report on Patentability (Ch. II) for International Patent Application No. PCT/US08/63227, mailed Oct. 31, 2011, Patent Cooperation Treaty, 25 pgs.
Corrected International Preliminary Report on Patentability (Ch. II) for International Patent Application No. PCT/US08/63227, mailed Feb. 2, 2012, Patent Cooperation Treaty, 22 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/025,300, mailed Aug. 6, 2012, 30 pgs.
Office Action for U.S. Appl. No. 12/861,609, mailed Aug. 7, 2012, 10 pgs.
Office Action for U.S. Appl. No. 13/091,877, mailed Oct. 11, 2012, 14 pgs.
Office Action for U.S. Appl. No. 12/025,436, mailed Nov. 9, 2012, 34 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action for U.S. Appl. No. 12/861,609, mailed Jan. 4, 2013, 12 pgs.
Office Action for U.S. Appl. No. 12/025,300, mailed Feb. 15, 2013, 35 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Office Action for U.S. Appl. No. 11/801,809, mailed Mar. 27, 2013, 13 pgs.
Office Action for U.S. Appl. No. 12/861,612, mailed Jun. 11, 2013, 12 pgs.
Office Action for U.S. Appl. No. 12/025,300, mailed Jul. 30, 2013, 29 pgs.
Office Action for U.S. Appl. No. 12/888,954, mailed Aug. 23, 2013, 16 pgs.
Office Action for U.S. Appl. No. 12/861,609, mailed Sep. 6, 2013, 11 pgs.
Office Action for U.S. Appl. No. 11/801,809, mailed Dec. 17, 2013, 8 pgs.
Office Action for U.S. Appl. No. 12/025,300, mailed Jan. 2, 2014, 33 pgs.
Office Action for U.S. Appl. No. 12/025,300, mailed Apr. 23, 2014, 29 pgs.
Office Action for U.S. Appl. No. 14/143,046, mailed May 7, 2014, 18 pgs.
Office Action for U.S. Appl. No. 14/099,591, mailed Jun. 2, 2014, 13 pgs.
Office Action for U.S. Appl. No. 14/099,591, mailed Oct. 1, 2014, 5 pgs.
Office Action for U.S. Appl. No. 14/464,034, mailed Nov. 5, 2014, 8 pgs.
Office Action for U.S. Appl. No. 14/092,729, mailed Dec. 24, 2014, 8 pgs.
Office Action for U.S. Appl. No. 12/888,954, mailed Jan. 5, 2015, 15 pgs.
Office Action for U.S. Appl. No. 14/574,077, mailed Feb. 25, 2015, 15 pgs.
Notice of Allowance for U.S. Appl. No. 14/574,077, mailed Jun. 15, 2015, 5 pgs.
Office Action for U.S. Appl. No. 12/888,954, mailed Jul. 14, 2015, 15 pgs.

(56) References Cited

OTHER PUBLICATIONS

Kolaks, Marc S., "Securing out-of-band device management," SANS Institute 2003, GIAC Security Essentials Certification (GSEC), Practical Version 1.4, pp. 1-19.
Notice of Allowance for U.S. Appl. No. 14/092,729, mailed Aug. 11, 2015, 5 pgs.
Notice of Allowance for U.S. Appl. No. 14/574,077, mailed Sep. 23, 2015, 5 pgs.
Notice of Allowance for U.S. Appl. No. 14/737,007, mailed Oct. 13, 2015, 9 pgs.
Office Action for U.S. Appl. No. 14/144,077, mailed Nov. 12, 2015, 15 pgs.
Notice of Allowance for U.S. Appl. No. 14/574,077, mailed Jan. 21, 2016, 4 pgs.
Notice of Allowance for U.S. Appl. No. 14/144,077, mailed Apr. 7, 2016, 5 pgs.
Office Action for U.S. Appl. No. 14/144,067, mailed May 4, 2016, 11 pgs.
Office Action for U.S. Appl. No. 12/888,954, mailed Jun. 15, 2016, 15 pgs.

* cited by examiner

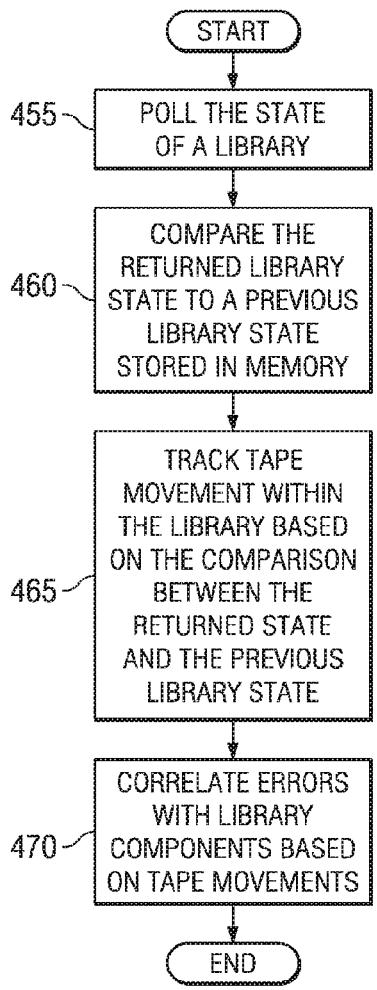

FIG. 4

```
<res timestamp="2007/01/29 09:55:05">
<status>0x0</status>
<sn>DELL1_3134667P1589</sn>
<library timestamp="2007/01/29 9:55:05">

<robot><sn>DELL1_3134667P1589</sn></robot>
<slot><elem_id>0x1009</elem_id></slot>
<slot><elem_id>0x1008</elem_id></slot>
<slot><elem_id>0x1007</elem_id>
<tape>
<vol_id>000105</vol_id>
<cleaning_type>0x0</cleaning_type>
<media_type>0x0</media_type>
<media_domain>0x0</media_domain>
</tape>
</slot>
<slot><elem_id>0x1006</elem_id></slot>
<slot><elem_id>0x1005</elem_id></slot>
<slot><elem_id>0x1004</elem_id></slot>
<slot><elem_id>0x1003</elem_id></slot>
<slot><elem_id>0x1002</elem_id></slot>
<slot><elem_id>0x1001</elem_id></slot>
<slot><elem_id>0x1000</elem_id></slot>
<cap><elem_id>0x10</elem_id></cap>
<drive>
<elem_id>0x101</elem_id>
<sn>1210139351</sn>
<transport_type>0x37</transport_type>
<transport_domain>0x4c</transport_domain>
</drive>
<drive>
<elem_id>0x100</elem_id>
<sn>1210140255</sn>
<transport_type>0x37</transport_type>
<transport_domain>0x4c</transport_domain>
<tape>
<vol_id>000019</vol_id>
<cleaning_type>0x0</cleaning_type>
<media_type>0x0</media _type>
<media_domain>0x0</media_domain>
</tape>
</drive>
</library>
</res
```

FIG. 5

```
                    610                                              620
┌──────────────────────────────────────┐         ┌──────────────────────────────────────┐
<res timestamp="2007/01/29 09:55:05">            <res timestamp="2007/01/29 09:55:05">
<status>0x0</status>                             <status>0x0</status>
<sn>DELL1_3134667P1589</sn>                      <sn>DELL1_3134667P1589</sn>
<library timestamp="2007/01/29 9:55:05">         <library timestamp="2007/01/29 9:55:05">

<robot><sn>DELL1_3134667P1589</sn>               <robot><sn>DELL1_3134667P1589</sn>
</robot>                                         </robot>
<slot><elem_id>0x1009</elem_id></slot>           <slot><elem_id>0x1009</elem_id></slot>
<slot><elem_id>0x1008</elem_id></slot>           <slot><elem_id>0x1008</elem_id></slot>
<slot><elem_id>0x1007</elem_id>                  <slot><elem_id>0x1007</elem_id></slot>
 <tape>                                          <slot><elem_id>0x1006</elem_id></slot>
  <vol_id>000105</vol_id>          630           <slot><elem_id>0x1005</elem_id></slot>
  <cleaning_type>0x0</cleaning_type>             <slot><elem_id>0x1004</elem_id></slot>
  <media_type>0x0</media_type>                   <slot><elem_id>0x1003</elem_id></slot>
  <media_domain>0x0</media_domain>               <slot><elem_id>0x1002</elem_id></slot>
 </tape>                                         <slot><elem_id>0x1001</elem_id></slot>
</slot>                                          <slot><elem_id>0x1000</elem_id></slot>
<slot><elem_id>0x1006</elem_id></slot>           <cap><elem_id>0x10</elem_id></cap>
<slot><elem_id>0x1005</elem_id></slot>           <drive>
<slot><elem_id>0x1004</elem_id></slot>           <elem_id>0x101</elem_id>
<slot><elem_id>0x1003</elem_id></slot>           <sn>1210139351</sn>
<slot><elem_id>0x1002</elem_id></slot>           <transport_type>0x37</transport_type>
<slot><elem_id>0x1001</elem_id></slot>           <transport_domain>0x4c</transport_domain>
<slot><elem_id>0x1000</elem_id></slot>           <tape>
<cap><elem_id>0x10</elem_id></cap>                <vol_id>000105</vol_id>
<drive>                                           <cleaning_type>0x0</cleaning_type>
<elem_id>0x101</elem_id>                          <media_type>0x0</media_type>
<sn>1210139351</sn>                               <media_domain>0x0</media_domain>
<transport_type>0x37</transport_type>            </tape>
<transport_domain>0x4c</transport_domain>        </drive>
</drive>                                         <drive>
<drive>                                          <elem_id>0x100</elem_id>
<elem_id>0x100</elem_id>                         <sn>1210140255</sn>
<sn>1210140255</sn>                              <transport_type>0x37</transport_type>
<tranport_type>0x37</transport_type>             <transport_domain>0x4c</transport_domain>
<transport_domain>0x4c</transport_domain>        <tape>
<tape>                                            <vol_id>000019</vol_id>
 <vol_id>000019</vol_id>                          <cleaning_type>0x0</cleaning_type>
 <cleaning_type>0x0</cleaning_type>               <media_type>0x0</media_type>
 <media_type>0x0</media_type>                     <media_domain>0x0</media_domain>
 <media_domain>0x0</media_domain>                </tape>
</tape>                                          </drive>
</drive>                                         </library>
</library>                                       </res>
</res>
```

*FIG. 6*

METHOD AND SYSTEM FOR MONITORING OF LIBRARY COMPONENTS

CROSS-REFERENCE TO RELATED APPLICATION

This application is a continuation of, and claims a benefit of priority under 35 U.S.C. 120 of the filing date of U.S. patent application Ser. No. 14/574,077, filed on Dec. 17, 2014, entitled "METHOD AND SYSTEM FOR NON-INTRUSIVE MONITORING OF LIBRARY COMPONENTS", which is a continuation of, and claims a benefit of priority under 35 U.S.C. 120 of the filing date of U.S. patent application Ser. No. 14/324,980, filed on Jul. 7, 2014, entitled "METHOD AND SYSTEM FOR NON-INTRUSIVE MONITORING OF LIBRARY COMPONENTS", issued as U.S. Pat. No. 8,949,667, which is a continuation of, and claims a benefit of priority under 35 U.S.C. 120 of the filing date of U.S. patent application Ser. No. 11/801,809, filed on May 11, 2007, entitled "METHOD AND SYSTEM FOR NON-INTRUSIVE MONITORING OF LIBRARY COMPONENTS", issued as U.S. Pat. No. 8,832,495, the entire contents of which are hereby expressly incorporated by reference for all purposes.

TECHNICAL FIELD OF THE INVENTION

The present invention relates to methods and systems for monitoring components of a library. More particularly, the present invention relates to methods and systems for monitoring library components by tracking library components in a non-intrusive manner using an out-of-band appliance.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage, e.g. multiple magnetic tapes. Centralized data backup has the advantage of increased volume, efficiency and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation which may degrade individual library component(s) to a point where the degraded component(s) can no longer be reliably used. Degradation of library components may render a library unreliable and prone to data loss, diminishing the library's usefulness as a backup device. The failing of even one library component can cause the loss of valuable data. Furthermore, the process of determining which library component is failing and rendering the library unreliable can be time consuming, uncertain and expensive.

SUMMARY OF THE INVENTION

Embodiments of the present invention provide a method and system of monitoring library components that eliminates, or at least substantially reduces, the shortcomings of prior art library systems and methods. More particularly, embodiments of the present invention comprise polling the state of a library at intervals and monitoring library components based on a set of returned library states from the polling of the library. The method can also comprise comparing returned library states to track the movement of one or more library component(s). The method can further comprise correlating errors with a particular library component based on the movement of one or more library component(s). Thus tape movements can be tracked and library components monitored.

Another embodiment of the present invention can include a set of computer instructions executable by a computer processor to poll the state of a library at intervals and monitor library components based on a set of returned library states from the polling of the library. The computer instructions can also be executable to compare returned library states to track the movement of one or more library component(s). The computer instructions can be further executable to correlate errors with a particular library component based on the movement of one or more library component(s). In this manner, the computer instructions can be executable to track tape movements and monitor library components.

The present invention provides an advantage over prior art systems and methods of monitoring libraries by providing a non-intrusive method of monitoring library components: the state of a library can be monitored without having to intercept commands and data being sent to or from the library. An additional advantage is that the monitoring appliance does not have to be in-band, but can be an out-of-band device. This allows the monitoring appliance to be a self-contained device which can be coupled to a switch or network, allowing for easy deployment. This can reduce the complexity and cost of monitoring library components.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 4 is a flowchart illustrating a method for monitoring library components according to one embodiment of the present invention;

FIG. 5 is an example representation of a library state; and

FIG. 6 is an example comparison of representations of library states polled at different times.

DETAILED DESCRIPTION

Preferred embodiments of the invention are illustrated in the FIGURES, like numerals being used to refer to like and corresponding parts of the various drawings.

Embodiments of the present invention provide a method and system for monitoring the components of a library. By monitoring library components, the degradation and reliability of library components can be monitored, allowing unreliable or unacceptably degraded components to be identified, thus allowing for the unreliable or degraded components to be bypassed or replaced, enhancing the reliability of the library and proactively preventing data loss.

Figure 1:
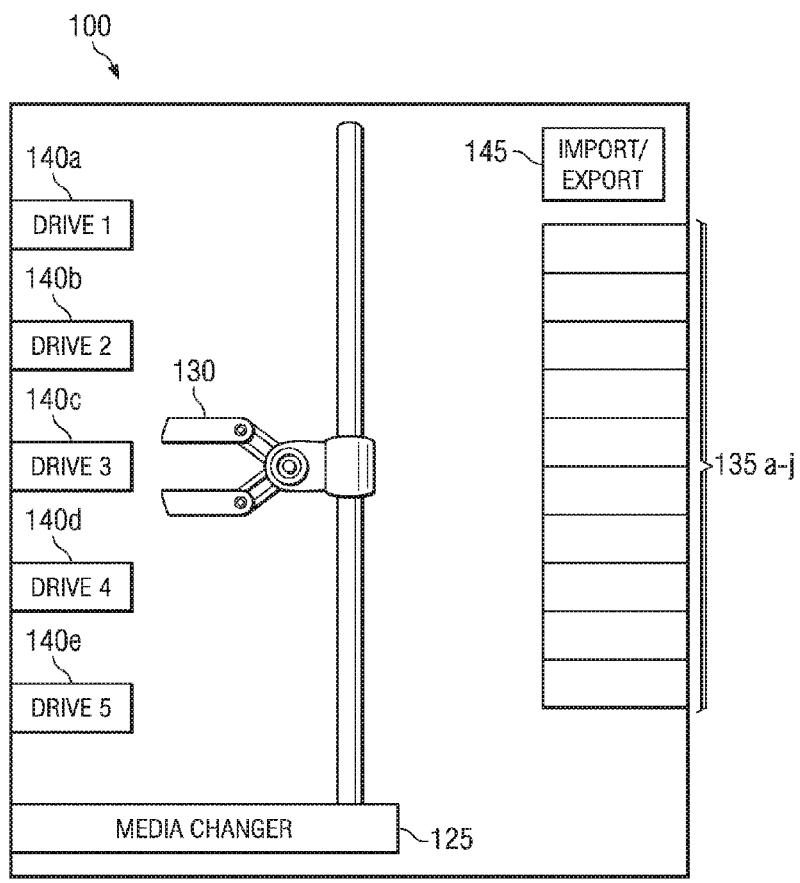
FIG. 1 is a diagrammatic representation of one embodiment of a library.

FIG. 1 is a diagrammatic representation of one embodiment of a tape library, as would be understood by one of ordinary skill in the art. Library 100 can comprise drives 140a-140e, media changer 125 and associated robot 130, import/export element(s) 145 and slots 135a-135j. Drives 140a-140e can read/write data from/to magnetic tape (contained within cartridges), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be written to the tape cartridge. It should be noted that some libraries may employ a single robot or multiple robots in an expandable or modular configuration.

A Read Element Status (RES) command is a command which is used to poll the state of a library. That is, a RES command is sent to a library and in response, the library returns its current state, including the locations of individual tape cartridges. Thus a RES command provides a snapshot of a library at any one time. Examples of a RES command can be found in section 6.5 of NCITS T10/999D Revision 10a Specification, section 6.10 of INCITS T10/1383D Revision 7 Specification and section 6.10 of INCITS T10/1730-D Revision 5 Specification; all of the above-mentioned Specifications are hereby incorporated by reference.

A drive inquiry is an inquiry command that is used to query the serial number of components of a library such as a tape drive or other drive or a media changer. Embodiments of drive inquiry commands query single library components. That is, an individual drive inquiry may regard one library component.

Embodiments of the invention utilize a monitoring appliance which can be a Read Verify Appliance (RVA). The monitoring appliance polls the state of a library over time by sending RES commands to the library at intervals. Returned library states are compared. Based on the comparison between the returned library states, the movement of tape cartridges over time can be tracked.

In further embodiments of the invention, a library state is represented as a XML representation of data returned in response to a RES command. A XML representation can be supplemented with data returned in response to one or more drive inquires. For example, a supplemented XML representation of a library state can include serial numbers of library components determined from drive inquiries issued to corresponding library components. In other embodiments of the invention, a library state can be represented in a different format.

Tracking the movement of tape cartridges or other media allows sources of errors to be identified. For example, an individual tape cartridge may suffer from an increasing number of data errors in any drive: this implies that the tape cartridge is degrading and may require replacement. In another example, a tape cartridge may encounter errors when used with a tape drive A but may encounter no errors when used with other tape drives. If other tape cartridges encounter errors when used with tape drive A, but encounter no errors when used with other tape drives, this implies that tape drive A is unreliable. Accordingly, tape drive A may be bypassed or replaced. By tracking the movement of one or more tape cartridges, errors can be correlated to a particular tape or drive.

It should be noted that the intervals between polling can be fixed periods of time or of variable duration or a combination of the two. In one embodiment, the monitoring appliance polls a library every 30 seconds. In another embodiment, the time duration between polling is less than the backup time or the tape movement time. In embodiments of the invention, the intervals can be determined by computer algorithm or user input.

Figure 2:
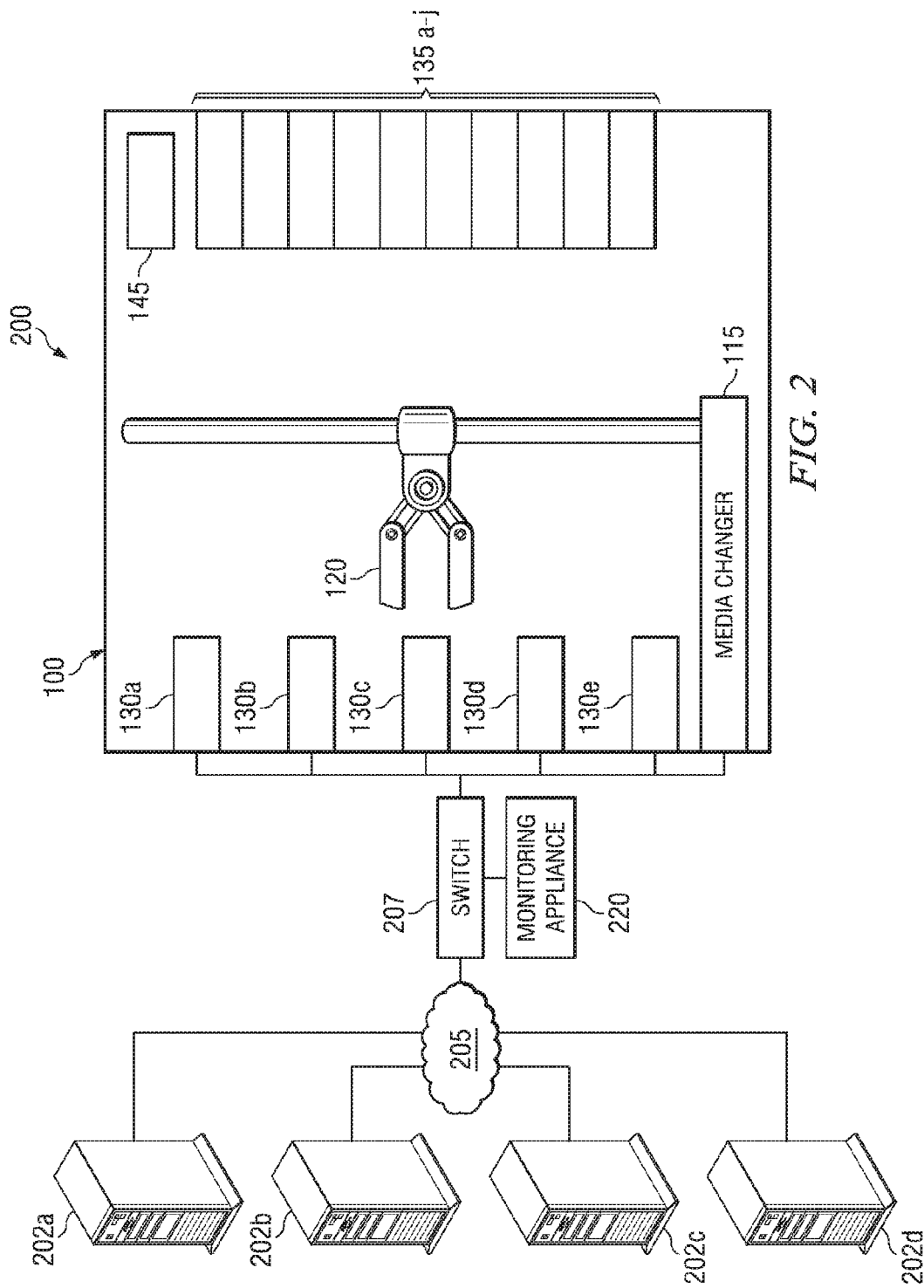
FIG. 2 is a diagrammatic representation of one embodiment of a backup system using a library and having a monitoring appliance.

FIG. 2 is a diagrammatic representation of a system 200 in which a plurality of hosts 202a-202d have access to library 100 over network 205. Network 205 can comprise the Internet, a SAN, a LAN, a WAN, a wireless network or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Switch 207 is connected to monitoring appliance 220.

Switch 207 is connected to library 100. Thus switch 207 can forward RES commands from monitoring appliance 220 to library 100. Switch 207 receives the library state generated in response to the RES command from library 100 and forwards the library state to monitoring appliance 220 which stores the library state and/or compares it with one or more previous library states. Thus monitoring appliance 220 can continually poll the state of library 100, track tape movements and monitor the components of library 100. Because monitoring appliance 220 tracks tape movements using RES commands, monitoring appliance 220 does not need to intercept commands or responses from network 205 to track tape movements. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be coupled to a switch and which does not have to be integrated into network 205. An advantage of this out-ofband methodology is that a monitoring appliance can be used to monitor library components without cumbersome configuring.

While shown as a physical media library in FIG. 2, library 100 can be a virtual media library that is a virtual representation of one or more physical media libraries as presented by switch 207, a library controller or other component. Examples of library virtualization are described in U.S. patent application Ser. No. 10/704,265, entitled SYSTEM AND METHOD FOR CONTROLLING ACCESS TO MULTIPLE PHYSICAL MEDIA LIBRARIES, and U.S. patent application Ser. No. 10/703,965, entitled SYSTEM AND METHOD FOR CONTROLLING ACCESS TO MEDIA LIBRARIES, both of which are hereby incorporated by reference herein.

Figure 3:
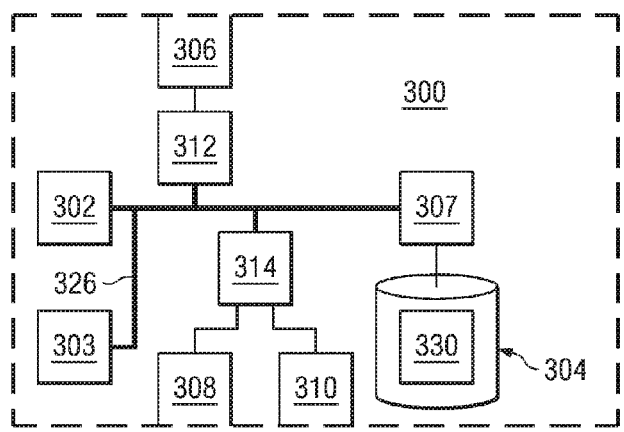
FIG. 3 is a diagrammatic representation of one embodiment of a controller which can be used in a monitoring appliance.

FIG. 3 is a diagrammatic representation of a monitoring appliance controller 300 ("controller 300"). Controller can include a processor 302, such as an Intel Pentium 4 based processor (Intel and Pentium are trademarks of Intel Corporation of Santa Clara, Calif.), a primary memory 303 (e.g., RAM, ROM, Flash Memory, EEPROM or other computer readable medium known in the art) and a secondary memory 304 (e.g., a hard drive, disk drive, optical drive or other computer readable medium known in the art). A memory controller 307 can control access to secondary memory 304. Controller 300 can comprise a communications interface 306 (e.g., fibre channel interface, Ethernet port or other communications interface known in the art) to connect controller 300 to switch 207. An I/O controller 312 can control interactions with switch 207. Similarly, an I/O controller 314 can control interactions over I/O interfaces 308 and 310. Controller 300 can include a variety of input devices. Various components of controller 300 can be connected by a bus 326.

Secondary memory 304 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 304 can store a software program 330 that monitors library components. During execution by processor 302, portions of program 330 can be stored in secondary memory 304 and/or primary memory 303.

FIG. 4 is a flow chart illustrating one embodiment of a method for monitoring library components. According to one embodiment, the method of FIG. 4 can be implemented as a set of computer executable instructions stored on a computer readable medium at, for example, monitoring appliance 220. The set of computer executable instructions can, when executed, monitor library components in a nonintrusive manner. At step 455, the state of the library is polled by sending a RES command directly or indirectly to the library. The library returns its present state, including the locations of tapes in the library. The returned library state is received by the monitoring appliance. At step 460, the returned library state is compared to a previous library state. Based on the comparison between the returned library state and the previous library state, tape movements within the library can be tracked (step 465). For example, if in the previous library state, a tape was at a specified drive in the library and in the returned state of the library, the same tape is in a slot, it can be determined that the tape has been moved from the drive to the slot. Based on such comparisons between library states, the movement of tapes within a library can be tracked over time. At step 470, errors are correlated with library components based on tape movements. This allows the monitoring appliance to monitor the degeneration of library components. For example, if a drive registers an increasing number of errors, regardless of the robot or tape used with the drive, then the drive is likely degenerating and becoming increasingly unreliable. Accordingly, this allows the failing drive to be identified and bypassed or replaced before it causes data loss or library failure.

In embodiments of the invention, library states are supplemented with additional data. Such data can be obtained from, for example, one or more drive inquires and can include the serial number of one or more components.

Either tape movements can be stored and used to monitor library components or the actual library states can be stored and used to track tape movements. It is possible to store both tape movements or library states or any combination of the two. Tape movements or library states can be stored in memory, in a database or according to other data storage schemes to allow for easy access.

FIG. 5 is an example representation of a library state returned in response to a RES command. This representation is for a library with ten slots, one import/export element, two drives and two tapes.

FIG. 6 is an example comparison of representations of library states returned in response to RES commands issued at different times. State 610 is returned at a time. State 620 is returned at a subsequent time. By comparing the differences between the two states, it is possible to determine that the tape with volume identity 000105 has moved from the slot at element identity 0x1007 to the drive at element identity 0x101. This movement is shown by directional arrow 630.

Embodiments of the present invention can also be implemented with respect to libraries of media other than magnetic tapes. For example, the library can comprise a plurality of optical disks (i.e., an optical jukebox) or removable hard drives. Other libraries can utilize a combination of different storage media such as hard drives, magnetic media or optical media.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:
1. A monitoring device, comprising,
an interface, wherein the monitoring device is communicatively coupled to a media library through the interface, the media library comprising a plurality of library components including a plurality of media; and
a controller, including a processor, for monitoring library components of the media library by:
sending a plurality of commands to the media library over a period of time;
tracking movement of media in the media library based on states returned in response to the plurality of commands, wherein a returned state comprises a current location of media in the media library;
correlating errors of library components with the media based on the movement of the media; and
identifying a library component of the media library as an error source based on the correlation.

2. The monitoring device of claim 1, wherein the media are set of tapes and the library components further comprise a robot, a slot or a drive.

3. The monitoring device of claim 1, wherein the media library is a virtual media library.

4. The monitoring device of claim 1, wherein tracking movement of media comprises comparing a first library state returned in response to a first command to a second library state returned in response to a second command.

5. The monitoring device of claim 1, wherein the commands include one or more Read Element Status Commands or one or more inquiry commands.

6. The monitoring device of claim 1, wherein each of the plurality of commands is sent at a time interval, wherein the time interval is less than a backup time or a tape movement time for the media library.

7. The monitoring appliance of claim 1, wherein the monitoring device is an out-of-band monitoring appliance.

8. A method of monitoring library components, comprising,
sending a plurality of commands to a media library over a period of time, the media library comprising a plurality of library components including a plurality of media;
tracking movement of media in the media library based on states returned in response to the plurality of commands, wherein a returned state comprises a current location of media in the media library;
correlating errors of library components with the media based on the movement of the media; and
identifying a library component of the media library as an error source based on the correlation.

9. The method of claim 8, wherein the media are set of tapes and the library components further comprise a robot, a slot or a drive.

10. The method of claim 8, wherein the media library is a virtual media library.

11. The method of claim 8, wherein tracking movement of media comprises comparing a first library state returned in response to a first command to a second library state returned in response to a second command.

12. The method of claim 8, wherein the commands include one or more Read Element Status Commands or one or more inquiry commands.

13. The method of claim 8, wherein each of the plurality of commands is sent at a time interval, wherein the time interval is less than a backup time or a tape movement time for the media library.

14. The method of claim 8, wherein the monitoring device is an out-of-band monitoring appliance.

15. A non-transitory computer readable medium, comprising instructions for:
sending a plurality of commands to a media library over a period of time, the media library comprising a plurality of library components including a plurality of media;
tracking movement of media in the media library based on states returned in response to the plurality of commands, wherein a returned state comprises a current location of media in the media library;
correlating errors of library components with the media based on the movement of the media; and
identifying a library component of the media library as an error source based on the correlation.

16. The computer readable medium of claim 15, wherein the media are set of tapes and the library components further comprise a robot, a slot or a drive.

17. The computer readable medium of claim 15, wherein the media library is a virtual media library.

18. The computer readable medium of claim 15, wherein tracking movement of media comprises comparing a first library state returned in response to a first command to a second library state returned in response to a second command.

19. The computer readable medium of claim 15, wherein the commands include one or more Read Element Status Commands or one or more inquiry commands.

20. The computer readable medium of claim 15, wherein each of the plurality of commands is sent at a time interval, wherein the time interval is less than a backup time or a tape movement time for the media library.

21. The computer readable medium of claim 15, wherein the monitoring device is an out-of-band monitoring appliance.

* * * * *